Dec. 17, 1957  C. E. STUART  2,816,360
DENTAL ARTICULATOR
Filed May 2, 1955  2 Sheets-Sheet 1
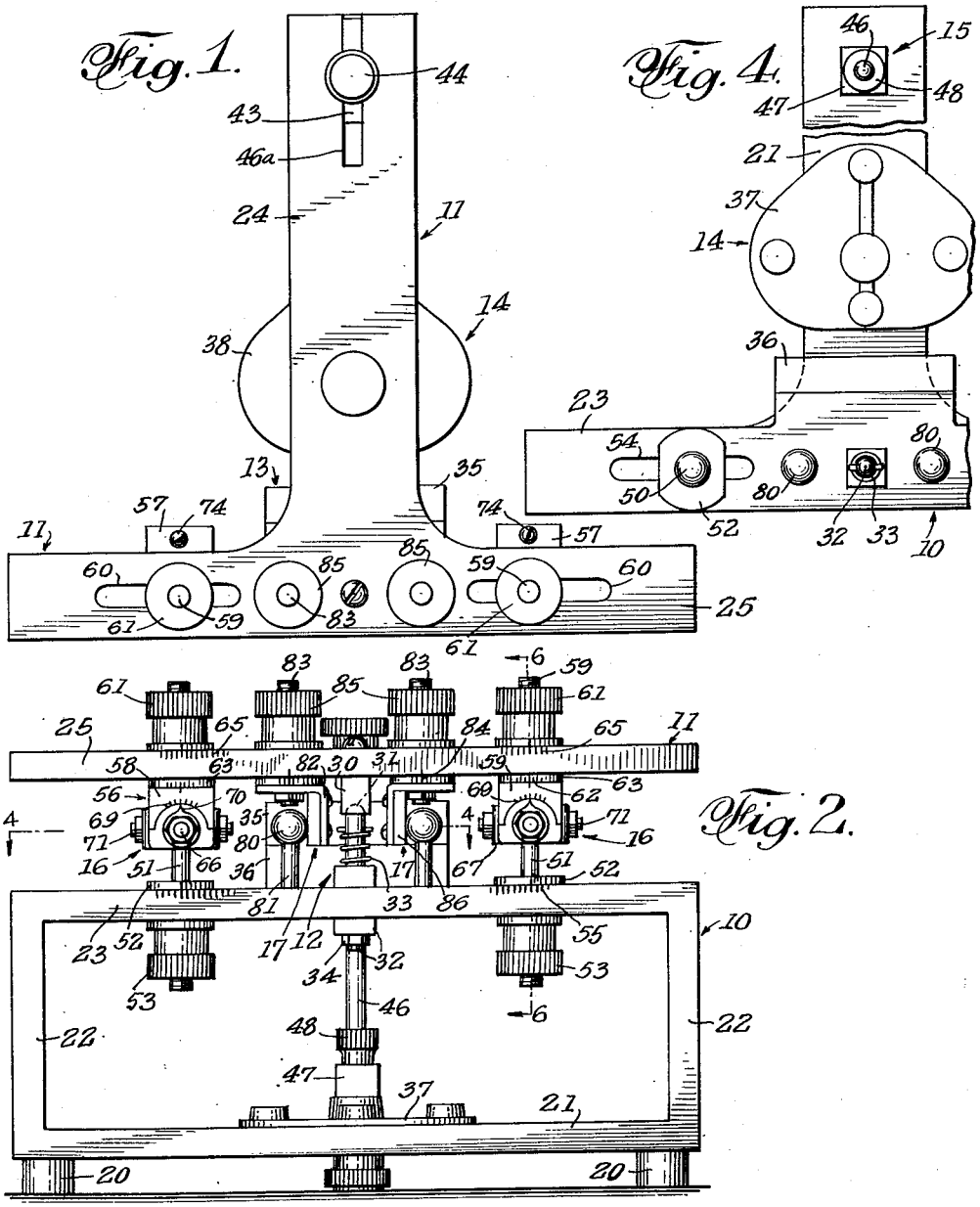
INVENTOR.
CHARLES E. STUART
BY C. J. Stratton
ATTORNEY Dec. 17, 1957 C. E. STUART 2,816,360
DENTAL ARTICULATOR
Filed May 2, 1955 2 Sheets-Sheet 2
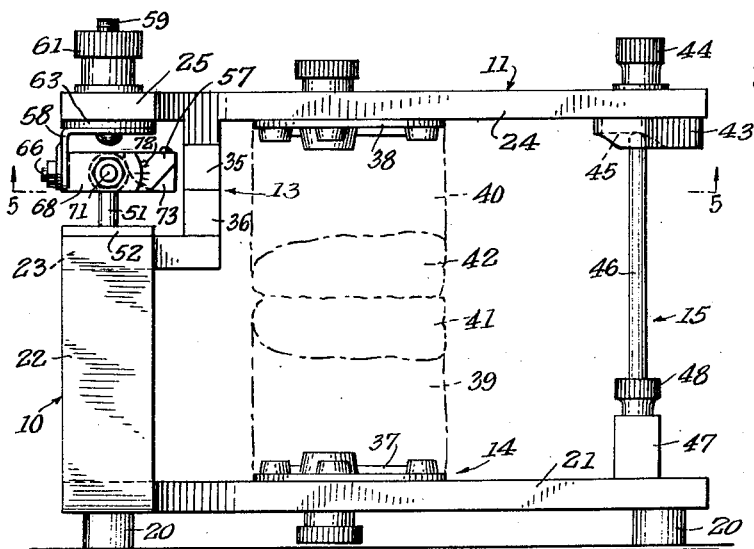
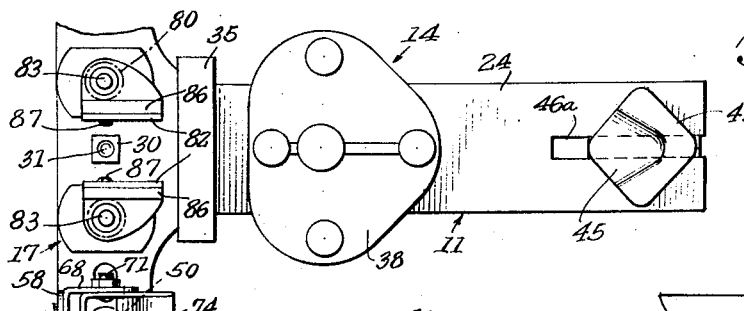
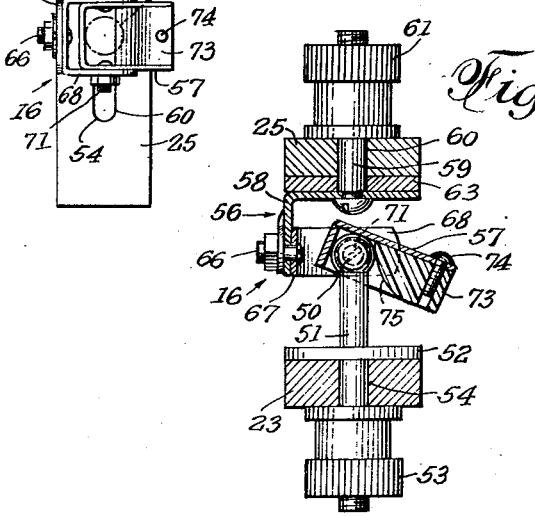
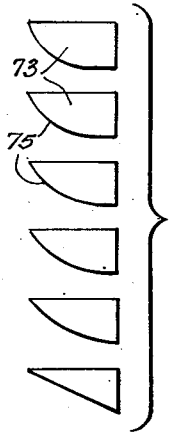
INVENTOR.
CHARLES E. STUART
BY C. G. Stratton
ATTORNEY ated Dec. 17, 1957

2,816,360

DENTAL ARTICULATOR

Charles E. Stuart, Ventura, Calif.

Application May 2, 1955, Serial No. 505,223

10 Claims. (Cl. 32—32)

This invention relates to a dental articulator and has for an object to provide an articulator that will reproduce not only all of the positions of the human jaw but will also reproduce the paths of movement or motion of the jaw.

Another object of the invention is to provide articulator means by means of which accurate measurement of jaw movement may be ascertained for the purpose of diagnosing malfunction of the human masticatory system and for guiding the creation of a harmonious interplay of the cusps of human teeth.

A more particular object of the invention is to provide an articulator instrument that may be advantageously used for producing dentures of various types that, when placed in the mouth, will conform exactly to the jaw motions and positions.

A further object of the invention is to provide a dental articulator that has the following advantages: retention of centric jaw relation; universal adjustability to conform to the jaw motions of any individual; provision of upper and lower articulator components that are, respectively, mechanical counterparts of the upper and lower human jaw; providing interaction between the upper and lower components that occurs on a line or plane above the hinge axis (this being in duplication of the action of the jaw hinge or joint); ready separation of said components, so that all portions thereof may be more readily reached for performance of work thereon; employment of magnetic force to draw the articulator components into operative engagement, thus obviating the use of more time-consuming means for this purpose; etc.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a plan view of a dental articulator according to the present invention.

Fig. 2 is a rear elevational view thereof.

Fig. 3 is a side elevational view.

Fig. 4 is a broken plan view as taken on line 4—4 of Fig. 2.

Fig. 5 is a broken bottom plan view as taken on line 5—5 of Fig. 3.

Fig. 6 is an enlarged cross-sectional view as taken on line 6—6 of Fig. 2.

Fig. 7 is a side view showing a group of condyle path guides used in the present instrument.

The present dental articulator comprises, generally, a lower or base frame 10, an upper frame 11, rearwardly placed means 12 for centering the frames, means 13 to draw the frames toward each other during articulation of one frame relative to the other, denture-model mounting means 14 carried by the frames, guide and rest means 15 for limiting closure of the frames 10 and 11 and for guiding lateral and protrusive movement of the frame 11 relatively to frame 10, left and right condyle-like means 16, and left and right shift guide means 17.

The base frame 10 may be supported by pads or feet 20 provided on a base plate 21 that is shown as T-shaped, the head of the T constituting the base of a vertical frame part 22 having a top plate 23.

The upper frame 11 comprises a plate 24 that is T-shaped similarly to the shape of plate 21, the head 25 of said plate conforming to the plate 23 of base frame 10.

The frame centering means 12 is shown as a projection 30 disposed centrally of the ends of plate 25 and provided with a downwardly-facing recess 31. Said projection is provided on frame 11. Said means 12 further includes a stud 32 carried by plate 23 of base frame 10 and directed to engage the recess 31. Said stud is resiliently projected as by a spring 33 and its limit of upward movement is determined by stop nut 34. Said stud, having resilient seating in recess 31, centers the frames 10 and 11 substantially in the manner shown.

The means 13 comprises a permanent magnet 35 carried by the upper frame and a similar magnet 36 carried by the base frame. Said magnets are so relatively positioned as to be attracted toward each other when the centering means 12 is engaged. Thus, whether the magnets are in physical contact or spaced so their lines of flux overlap or intermingle, the two frames are drawn toward each other and maintained in assembly.

Each frame mounts a model of the jaw to which related. Thus, the means 14 comprises a plate 37 adjustably carried by the lower frame 10 and a similar plate 38 similarly carried by the upper frame 11. Said plates 37 and 38 are so formed as to mount the respective stones or models 39 and 40 of the jaws. The latter, in time, are used to guide the production of dentures 41 and 42. It is the proper design and interrelationship of dentures 41 and 42, or other dental elements, that the present articulator is devised to achieve.

The means 15 comprises a guide rest 43 that is slidably mounted on the front end of plate 24 as by a tightening screw 44. Said rest is advantageously made of a plastic material, such as "Lucite" and is formed, in its under surface, with a cup 45 that may be adjusted to accommodate any vertical lift necessary to fit a great variety of cases. A suitable anterior-posterior adjustment of the guide rest 43 can be made along slot 46a in plate 24 and the adjustment locked by screw 44.

The means 15 further includes an anterior guide pin 46 that engages guide rest 43 in the cup 45 thereof. The length adjustment of said 46 may be effected through the medium of a seat nut 47 into which said pin may be adjustably threaded and a lock nut 48 to lock the adjusted position of said pin.

The right and left condyle-like means 16 are essentially similar. Each such means comprises a condyle ball 50 formed on the end of a shank 51 that extends from a washer 52 and is adapted to be locked in place on plate 23 by a tightening screw 53. Said shank extends through a slot 54 in plate 23, thereby enabling lateral adjustment of the ball 50, as desired. Any suitable calibration means 55 may be provided for guiding the lateral position of both balls 50 relative to the medial line of the instrument.

Each ball 50 is operatively engaged with a condyle fossae-like unit 56 that comprises a cup 57 capable of substantially universal adjustability relative to plate 25 on which mounted. Each unit 56 comprises a bracket 58 that is carried by and rotational on a bolt 59 which extends through a slot 60, in said plate 25. Said bolts 59, when aligned with balls 50, provide vertical axes of rotation that are coincident with the respective axes of stems 51. Each said bracket is locked in rotationally adjusted position as by a nut or screw 61 and angularly with respect to graduations 62 on washers 63 arranged to be non-rotational with bolts 59. Said units 56 are each laterally adjustable along slots 60 in plate 25 and with relation to calibrations 65 similar to calibrations 55.

On a horizontal trunnion 66 that extends front to back, each bracket 58 mounts an auxiliary bracket 67 of U-shaped form to provide laterally spaced ears 68. Each bracket 67 is capable of adjustment around the axis of each respective trunnion 66 and said adjustment may be read on a scale 69 on bracket 58 in connection with an index 70 carried by trunnion 66.

The ears 68 are laterally spaced and provide mounts for trunnions 71 on which are pivotally mounted the mentioned cups 57. The axes of said trunnions are horizontal. Thus, each cup 57 may be adjusted on the two transverse horizontal axes of trunnions 66 and 71, on the vertical axis of bolt 59, and laterally along slot 60 of plate 25. The scale 72 is used to read the last-described adjustment on trunnions 71.

Each cup 57 mounts a guide cam 73 that is removably held in the cup as by a screw 74. As seen in Fig. 7, said cams may have faces that vary with respect to their different radii 75 to afford a variety of condyle paths. Since, as seen in Fig. 6, each ball 50 is tangentially engaged with the face 75 of the cam in place in cup 57, the character of the path of movement of said cam relative to the ball will vary according to the degree of curvature of the cam face. By suitable selection of cam 73, the condyle path motion may be provided as desired.

The shift guide means 17 are disposed laterally inward of the means 16. Similar left and right means 17 are provided. Each such means comprises a shift control ball 80 that is fixedly mounted on plate 23 of the base frame 10 by means of a shank 81.

Each of the means 17 further includes a bracket 82 mounted on a stud or bolt 83 that is similar to bolt 59. Thus, said brackets 82 are rotationally adjustable around the axes of the respective bolts 83. Such adjustment may be read on calibrations 84, similar to calibrations 63. A nut 85 locks the adjustment of each bracket 82.

Each said bracket 82 mounts an interchangeable side shift guide plate 86, the same being accurately fitted to the brackets and secured in place as by screws 87.

In the manufacture of the present articulator, care should be taken to insure accurate alignment of balls 50 and 80 since such alignment insures that the hinge axis of the device extends commonly through the centers of the balls. In this connection, the accuracy of flatness of at least the upper face of plate 23 is important because the condyle balls 50 are adjustable laterally therealong. Also, to insure desired accuracy in the equality of adjustment of the different parts of the means 16, the machine practice of providing bench marks may be resorted to for relating the location of said means relative to a selected point on the frame or frames 10 and 11. Accuracy is important because all adjustments of means 16 are around the balls 50 of said means and unless said balls are accurately aligned maladjustment may result.

The above-mentioned right and left condyle means 16 provide a posterior terminal position for the balls 50 of said means. The pitch or slant of the condyle cams 73 is controlled by adjustment of the cups 57.

The centers of trunnions 71 represent the hinge axis of the articulator and the same are used as a reference for mounting the upper cast or model 40 in proper relation to the opening and closing axis (hinge axis) of the jaws on zero setting.

In order to allow shifting of the hinge axis in lateral movement of the instrument when one condyle ball 50 moves forward with rotation around the other condyle ball, two adjustments may be made, either separately or simultaneously. One adjustment is to elevate or depress the hinge axis by shifting bracket 67 around the axis of trunnion 66. The other is to accomplish an anterior or posterior shift of the hinge axis and to rotate bracket 58 around the axis of bolt 59. Also, the position of the lateral movement rotation center is adjusted by shift of the fossae-like unit 56 along slot 60. A like and conforming lateral adjustment of the condyle ball 50 associated with said unit is made.

The right and left side shift means 17 govern the direction and timing of the lateral shifting of the hinge axis in lateral movement. In most individuals, there is a lateral shifting of the jaw as it travels laterally. As the mandible moves forward on one side, while rotating around the opposite condyle, the mandible also shifts bodily inward toward the side to which the jaw moves, and, because the lower jaw is one part, the opposite rotating condyle must move outward at the same time. The means 17 is provided to effect a control simulating such control in the human jaw.

The method of use of the above-described articulator is as follows:

A face bow transfer is used for mounting the models of the human masticatory mechanism on the articulator. A bite fork having a projecting stud is placed between the teeth or endentulous areas. A typical face bow is attached to said stud. Caliper pins at the posterior ends of both sides of the face bow are adjusted until they are on the hinge axis of the jaw. A vertical and laterally adjustable indicator or caliper pin is carried by the bow to the right of its center (alongside the nose) and is adjusted to a point on the nose or face that represents the plane of the lower border of the orbits and extending to the hinge axis. This establishes the hinge axis-orbital plane. The position of the upper teeth or endentulous area is thus related to the axis-orbital plane as the teeth or endentulous areas rest upon the upper surface of the bite fork.

In connection with the above, reference may be had to applications, Serial Nos. 498,353 and 498,202 in which bows and axis-orbital plane establishing means such as may here be used are disclosed.

The bite fork, with the attached face bow, is then removed from the mouth and the same placed so that the axis-indicating posterior caliper pins are aligned with the centers of the outer trunnions 71 of the opposite fossae-like means 56. The face bow is then brought into parallelism with the upper frame 10. A previously-prepared model of the upper teeth or endentulous area is then placed on the bite fork of the bow while the same is held as above indicated. This model is connected to plate 38 by plaster or the like and this connection holds said model in the same position relative to the trunnions 71 that the upper teeth or endentulous area of the mouth has with respect to the mandibular joint of the jaw. Therefore, said model is in proper relation to the axis-orbital plane.

Now, wax or the like is placed between the patient's teeth or in the endentulous area and he is guided and instructed to close with the lower jaw in its posterior terminal or centric position. When the wax has set a relationship is established between the upper and lower jaws in centric position. This is the centric bite.

This wax bite is removed from the mouth and placed on the lower end of the upper model 40 and the same is in the same relative position to the axis of trunnions 71 as the patient's teeth assume relative to the jaw hinge.

This prepared upper frame 11 is placed over the base frame 10 in centric relationship and this assembly is inverted. Now, the model 39 is mounted on frame 10 in the manner above described for model 40 and with relation to model 40.

A mandibular movement recorder may be mounted on the articulator. Such a recorder is shown in said application Ser. No. 498,202. Now, the articulator herein disclosed may be adjusted to follow the tracings or paths of movement that have been made by the patient, as described in said latter application.

The rotation centers may be adjusted inward or outward, as the case may be by a corresponding adjustment of both the condyle balls 50 and the fossae-like units 56. The pitch or slant of the condyle path, as shown by said tracings, may be duplicated by adjustment of cups 57 around the axis of trunnions 71. A condyle path cam or guide 73 is selected from a set thereof (Fig. 7), according to the curvature of the condyle path, as shown by said tracings. To allow shifting of the opening-closing or hinge axis in lateral movement of the articular, two adjustments hereinbefore described, are made, either separately or simultaneously. These are: rotation of bracket 67 around the axis of trunnion 66 for the purpose of elevating or depressing the axis shift, and rotation of bracket 58 around the axis of bolt 59 to accomplish an anterior or posterior shift, as the case may be, of the hinge axis in lateral movement.

The shift guides 17 are adjusted by rotational adjustment of brackets 82 around bolts 83 so that the direction and timing of the lateral shift of the hinge axis accords with the tracing or record provided by the mandibular movement recorder. The shift guide plates 86, on the surfaces engaged by balls 80, are selectively ground and shaped to time the lateral shift according to the particular course described by the jaws of the patient.

The cavity or recess 45 of block 43 is also selectively ground to accommodate any desired vertical lift to fit any particular case in lateral and protrusive movements. Pin 46 limits closure of the base part of the articulator as the same moves about the simulated condyle hinge as above described.

Being universal in its adjustability, the present articulator, whether by use of a mandibular movement recorder or by data supplied in other ways, is capable of being so adjusted as to cause the dentures to move, while in the articulator, in the same way they will move while in the mouth. Since the magnetic means 13 enables a floating connection of the frames 10 and 11, the relative movement of the frames is uninhibited except by the adjustable controls.

In the human jaws, the lower jaw moves relative to the upper jaw. In the present articulator, the reverse of this movement is produced by moving the upper jaws. This difference is immaterial to the function of the device.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A dental articulator comprising in combination, upper and lower denture-model mounting frames, magnetic means on said frames cooperating to attract them toward each other, frame-centering means, means to limit closure of the frames and for guiding lateral and protrusive movement of the frames relatively, means simulating the condyle joint of a human jaw and mounted between the frames and held in operative engagement by the magnetic attraction of said magnetic means, and shift guide means between the condyle joint-simulating means.

2. A dental articulator according to claim 1: said condyle joint-simulating means and shift guide means being aligned between rearward portions of the frames, and the magnetic means being disposed anterior to the said aligned means.

3. A dental articulator according to claim 1: the closure-limiting and lateral-and protrusive-guiding means being disposed at the anterior portion of the frames and, in part, carried by each frame.

4. A dental articulator comprising a base frame, an upper frame, the frames being adapted to mount models of edentulous-dentulous areas, magnetic means on each frame cooperating to attractively draw the frames toward each other during relative movement of said models in simulation of the same movements of the human jaws, and means on both frames cooperating to guide such relative movement of the models, said latter means comprising condyle-like articulating means and shift guide means all arranged in alignment rearward of the magnetic means.

5. In an articulator upper and lower relatively movable frames, a fossae-like unit carried by one frame and provided with a guide cam mounted for universal adjustment relative to the frame on which carried, a rounded projection carried by the other frame and engaged with said unit, and magnetic means to draw the projection into the frame during relative lateral and protrusive movements of the frames.

6. In an articulator according to claim 5: shift guide means controlling the mentioned relative movement of the frames.

7. In an articulator according to claim 5: said unit comprising a bracket adjustable on a vertical axis, an auxiliary bracket carried by the mentioned bracket and adjustable on a horizontal axis, a cup carried by the auxiliary bracket and adjustable on a horizontal axis transverse to the first-mentioned horizontal axis, the mentioned guide cam being mounted in said cup.

8. In an articulator according to claim 5: said unit comprising a bracket adjustable on a vertical axis, an auxiliary bracket carried by the mentioned bracket and adjustable on a horizontal axis, a cup carried by the auxiliary bracket and adjustable on a horizontal axis transverse to the first-mentioned horizontal axis, the mentioned guide cam being mounted in said cup, said cam being provided with a face in held contact with the mentioned projection by the mentioned magnetic means.

9. In an articulator having upper and lower frames and including means to draw said frames toward each other, condyle balls fixedly carried by one frame, interchangeable condyle guide cams carried by the other frame, and means mounting said cams for universal adjustment relative to the frame on which carried.

10. In an articulator having upper and lower frames and including means to draw said frames toward each other, two sets of rounded projections carried by one frame, a pair of condyle guide cams interchangeably carried by the other frame and drawn into operative engagement with two of said projections by the means above mentioned, and a pair of interchangeable side shift guides in lateral operative engagement with the other two projections.

References Cited in the file of this patent
UNITED STATES PATENTS 2,555,392    Bierbach et al.    June 5, 1951
2,678,495    Fine    May 18, 1954